United States Patent [19]

Pedersen et al.

[11] Patent Number: 4,460,659

[45] Date of Patent: Jul. 17, 1984

[54] COPPER ALLOY WELDING FILLER AND METHOD OF USE

[75] Inventors: James R. Pedersen; David M. Parker; Robert G. Trechel, all of Schenectady, N.Y.

[73] Assignee: General Electric Company, Schenectady, N.Y.

[21] Appl. No.: 501,542

[22] Filed: Jun. 8, 1983

Related U.S. Application Data

[63] Continuation-in-part of Ser. No. 402,889, Jul. 29, 1982.

[51] Int. Cl.³ .................................. B32B 27/10
[52] U.S. Cl. ............................. 428/675; 428/636; 420/492; 148/24; 219/146.22; 219/85 H; 228/263.18; 228/263.11
[58] Field of Search ............. 228/263.18, 263.11; 219/146.1, 146.22, 137 WN, 85 H, 85 M; 420/469, 492; 428/636, 675; 148/24

[56] References Cited

FOREIGN PATENT DOCUMENTS

| 50-122417 | 9/1975 | Japan | 420/492 |
|---|---|---|---|
| 50-121121 | 9/1975 | Japan | 420/492 |
| 50-122418 | 9/1975 | Japan | 420/492 |
| 0359286 | 11/1972 | U.S.S.R. | 420/492 |

OTHER PUBLICATIONS

Zwicker, U., *Metall* 16 JG Heft 9, Sep. 1962, pp. 864–870.

*Primary Examiner*—L. Dewayne Rutledge
*Assistant Examiner*—Debbie Yee
*Attorney, Agent, or Firm*—John F. Ahern; Paul J. Checkovich

[57] ABSTRACT

A copper alloy welding filler for use in arc welding copper to produce sound welds with good mechanical strength and high electrical conductivity is disclosed. The filler consists essentially of a zirconium-boron copper alloy filler metal wherein the concentration ratio of zirconium to boron is at least about 4 to 1; the minimum concentration of boron is about 300 PPM; and the concentration of zirconium is a maximum of about 6000 PPM. The minimum level of about 300 PPM boron on a weight basis eliminates porosity in the weld; while zirconium below about 6000 PPM is effective to eliminate weld cracking without having a detrimental effect on the electrical conductivity.

14 Claims, 3 Drawing Figures

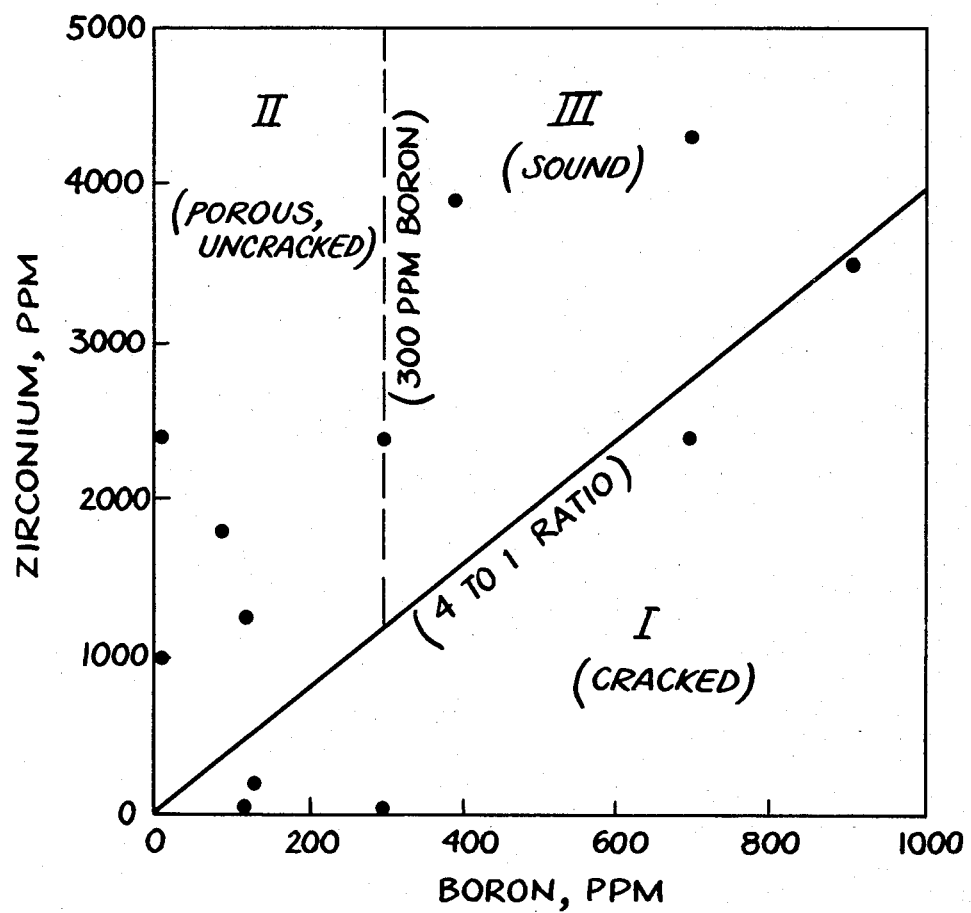

COPPER ALLOY WELDING FILLER AND METHOD OF USE

This application is a continuation-in-part of application Ser. No. 402,889, filed July 29, 1982.

The present invention provides copper alloy welding fillers capable of producing welds of high electrical conductivity and improved mechanical properties when used for arc welding copper, particularly copper of high electrical conductivity.

BACKGROUND OF THE INVENTION

Copper is a preferred metal for use in electrical machines such as generators, motors, and so forth because of its high electrical conductivity and its ready, economic availability. In fabricating and repairing these electrical machines it is frequently necessary to join together certain copper sections or segments of a subassembly in a manner that preserves both the electrical conductivity and the mechanical properties of the separate copper pieces.

For joining copper which is to be put to such uses, arc welding has not been a favored technique since the resulting welds, made with commercially available weld fillers, have been prone to cracking and porosity due to oxygen absorption. Weld filler materials previously developed to minimize these problems have contained rather large amounts of deoxidants such as silicon, manganese, and phosphorous. Since these deoxidants are highly soluble in copper, the welds produced are low in electrical conductivity (only 25 to 35% of the International Annealed Copper Standard, or IACS) and have large crystalline grain structure. The resulting welds are not only poorly conducting, but they also exhibit poor notch cracking resistance and are susceptible to hot cracking.

In view of the problems with arc welding, brazing techniques generally have been used in making copper-to-copper joints in the larger electrical machines such as, for example, the large electrical generators used for commercial scale power generation. Nevertheless, brazing also entails certain disadvantages in that costly brazing alloys must be used between joints that are overlapped to provide the large surface area necessary for keeping the electrical resistance low. Thus, even with brazing there is an increased use of copper material as compared with that used to make a simple butt welded joint. Increases in cost and weight of the machine are attendant.

Accordingly, it is among the objects of the present invention to provide a weld filler alloy with which copper base material can be soundly joined by conventional arc welding techniques to produce welds of high electrical conductivity, with good mechanical properties, and with high resistance to notch cracking.

Another object of the invention is to provide a copper alloy weld filler particularly useful for welding copper of higher electrical conductivity and including oxygen free copper (OFC), electrolytic tough pitch copper (ETP), and oxygen free copper of high and low residual phosphorous.

SUMMARY OF THE INVENTION

Sound welds with good room temperature mechanical properties are achieved in oxygen free copper (<5 ppm), electrolytic tough pitch, and high and low phosphorous copper with a zirconium-boron copper alloy filler metal wherein the concentration ratio of zirconium to boron is at least about 4 to 1; the minimum concentration of boron is about 0.03% (300 ppm); and the concentration of zirconium is a maximum of about 0.60% (6000 ppm). The combination of zirconium and boron produces adequate deoxidation and a fine dispersion which is uniformly distributed in the grains of copper. The dispersion is believed to be zirconium diboride ($ZrB_2$) which, being insoluble in copper, has little effect on either reducing the normally high electrical conductivity or the strength of the copper.

The occurrence of weld cracking with the Zr-B copper alloy filler is coincident with a ratio in the weld filler of zirconium to boron concentration ratios of less than about 4 to 1. Zirconium diboride, on a weight percent basis, contains 19.17% boron and 80.8% zirconium, yielding the approximately 4 to 1 ratio. The minimum level of about 0.03% boron on a weight basis is sufficient to eliminate porosity in the weld; while zirconium below about 0.60% is effective to eliminate weld cracking without having a detrimental effect on the weld's electrical conductivity.

BRIEF DESCRIPTION OF THE DRAWINGS

Other objects, features and advantages of the invention will become more fully apparent from the following detailed description of a preferred embodiment, the appended claims, and the accompanying drawing figures in which:

FIG. 3 is a graphic illustration of experimental results for various zirconium to boron ratios in experimental weld fillers and showing the delineation of a region for the production of sound welds.

DESCRIPTION OF THE INVENTION

Experimental Results

Figure 1:
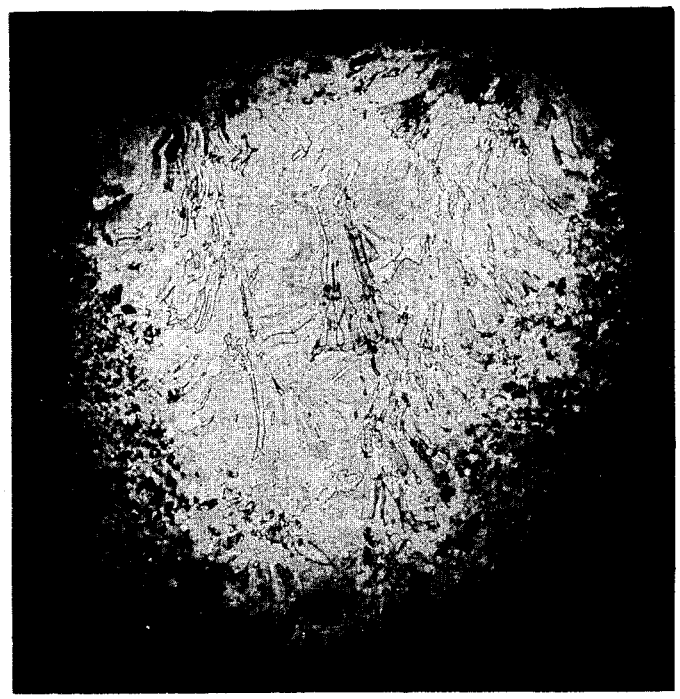
FIG. 1 is a photomicrograph at 8x magnification of a weld made in oxygen-free copper utilizing a copper alloy filler according to the invention.

Wire of various compositions was produced by vacuum melting and casting ingots of an appropriate size. The melting stock consisted of oxygen-free copper to which was added appropriate amounts of master alloys containing zirconium and boron. The ingots were subsequently machined into billets, extruded, then drawn down to wire sizes of ⅛" and 1/16" diameter for filler use. Preliminarily, a gas tungsten arc welding (GTAW) process was used to weld ¾" thick OFC copper with fillers containing: (1) boron only; (2) zirconium only; and (3) zirconium and boron. For these preliminary evaluations, the fillers were of ⅛" diameter and welding was carried out with helium shielding at 800° F.–1000° F. preheat and 400–450 amperes, electrode negative. The specifics of arc welding are well known in the art. One teaching is found in Metals Handbook, volume 6, Welding and Brazing, American Society For Metals (1971, Metals Park, Ohio, 44073) as specifically discussed for gas metal arc welding "GMAW" and gas tungsten arc welding "GTAW" on pages 78–137. The particular discussions of GMAW and GTAW are incorporated herein by reference thereto, in addition to the discussion of arc welding copper and copper alloys on pages 337–357 of that handbook.

Sections were removed from each weld and the electrical conductivity and soundness of the weld determined. The following Table 1 indicates filler compositions and results obtained for the preliminary evaluations.

TABLE 1

| Filler | Boron Content (wt. %) | Zirconium Content (wt. %) | Elec. Conductivity (% IACS) | Soundness |
|---|---|---|---|---|
| 1 | 0.012 | — | 100.1 | Porosity & Extensive Cracking |
| 2 | 0.30 | — | 94.4 | 1 Pore & Cracks |
| 3 | — | 0.10 | 94.1 | Porosity |
| 4 | — | 0.24 | 94.0 | Porosity |
| 5 | 0.009 | 0.18 | — | Porosity |
| 6 | 0.040 | 0.38 | 96.1 | Sound |
| 7 | 0.090 | 0.35 | — | Cracks |
| 8* | — | — | 26/39.5 | Oxides |

*A commercial filler, ECu

All weld deposits of this preliminary investigation, as shown in Table 1, exhibited electrical conductivity in excess of 94% of the International Annealed Copper Standard (IACS). The filler with 0.012 boron produced extensive cracking and porosity; increased boron to 0.03% reduced the porosity substantially, but cracking remained. The zirconium fillers, sample Numbers 3 and 4, with 0.1 and 0.24% zirconium, respectively, were free of cracking but did exhibit porosity. For the zirconium-boron fillers, the 0.18% Zr-0.009% B filler (Number 5) provides no noticeable improvement over the filler with only zirconium, but weld porosity is eliminated with the 0.38 Zr-0.04 B and the 0.35 Zr-0.09 B fillers (6 and 7, respectively). Filler Number 7, containing 0.09% boron, produced intergranular cracks in the weld. Most notable is that filler Number 6 (0.38 Zr-0.04 B) produced the only sound weld.

Table 2 details a typical analysis of the oxygen free copper base metal used for the experimental examples presented herein.

TABLE 2

| Composition of Oxygen-Free Copper Base Metal (PPM) | | | |
|---|---|---|---|
| Si | <1 | Be | <1 |
| P | <1 | Al | <1 |
| Mn | <1 | Ni | 9 |
| Fe | 5 | Cr | <1 |
| Sn | <1 | Cd | <0.1 |
| PG | 0.2 | O | 3 |

Subsequent to the preliminary testing described above, extensive test results were obtained with Zr-B fillers alloyed as follows: (1) 0.24% zirconium-0.07% boron, and (2) 0.43% zirconium-0.07% boron. Welds of these materials were made in OFC using both the gas tungsten arc welding process and the gas metal arc welding (GMAW) process, both of which are well known within the welding art. Both butt welds and cruciform welds were made to determine weld soundness, strength, and ductility. In addition, electrical conductivity and chemical analysis of the resulting welds for these fillers were determined.

For these experimental examples, the filler metals were of 1/16" diameter. The GTAW butt welds were made with a 60° included angle, single vee with a ½" root opening. For the GMAW process, a 90° included angle was used with a 3/32" to ⅛" root openings and a 3/32" wide land. Base material for the butt welds was of OFC copper, machined to ¾" by 3"×6" pieces; for the cruciforms the OFC base metal pieces were ¾" by 4"×6". Table 3 details the welding parameters.

TABLE 3

| | GTAW* | GMAW |
|---|---|---|
| Electrode Dia. | 1/16" ⅛" | 1/16" |
| Polarity | EN | EP |
| Preheat, °F. | 900/1100 | 1000/1400 |
| Interpass Temp. °F. | 1200 | 1400 |
| Volts | 22/25 | 30/33 |
| Amps | 350 | 380 |
| Passes-Butt Weld | 18/14 | 5 |
| Passes-Cruciform | 3 | 1 |
| Shielding Gas | Helium | Helium |
| Gas Flow, CFH | 60 | 60 |

*2% ThO$_2$ Tungsten Electrode

Figure 2:
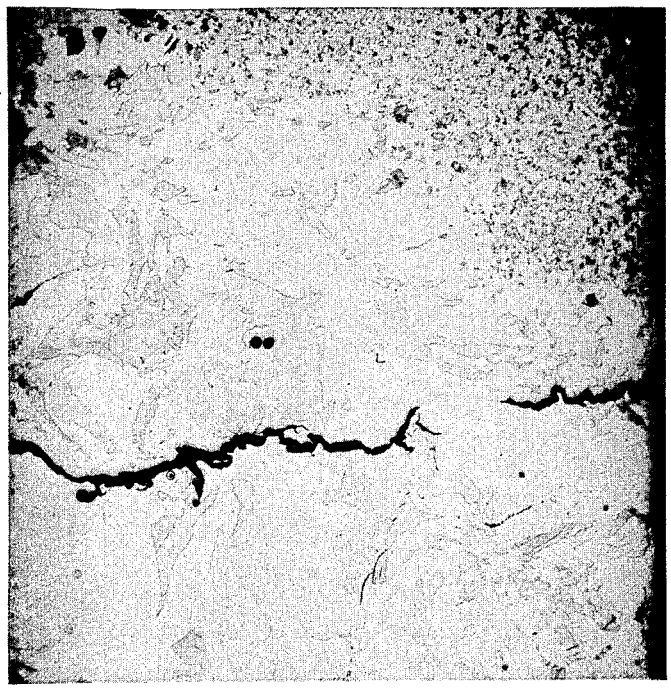
FIG. 2 is a photomicrograph at 10x magnification of a weld in oxygen-free copper utilizing a copper alloy filler having a zirconium to boron ratio of less than 4 to 1.

Butt welds made with the GTAW process and with these latter fillers (0.43% Zr-0.07% B and 0.24% Zr-0.07% B), when sectioned to determine soundness, revealed very sound welds for the 0.43% Zr-0.07% B filler, but intergranular cracks were produced in the welds made with the 0.24 Zr-0.07% B filler. Gas metal arc welds with the 0.24% Br-0.07% B filler did not exhibit cracking but did show some scattered porosity. FIG. 1 is a photomicrograph at 8x magnification showing the soundness of a weld produced with the 0.43% Zr-0.07% B filler; and FIG. 2 is a photomicrograph at 10x magnification of a weld made with the filler containing the lower ratio of zirconium to boron. Intergranular cracking is apparent in the latter figure, FIG. 2. Table 4 indicates relative electrical conductivities obtained with these fillers, along with a filler of 0.38% Zr-0.04% B, for both GTAW and GMAW welds.

TABLE 4

| Filler | Process | Elec. Conductivity (% IACS) |
|---|---|---|
| .38 Zr—0.04 B | GTAW | 96.1 |
| | GMAW | 98 |
| .24 Zr—.07 B | GTAW | 95 |
| | GMAW | 98 |
| .43 Zr—0.07 B | GTAW | 87 (91.0 in root) |
| | GMAW | 98 |

Tensile testing results for 0.505" diameter cross-welded specimens are given in Table 5. For comparison purposes, results obtained with a commercial filler, ECu, are also included in Table 5.

TABLE 5

| | | Room Temperature Tensile Results With Zr—B Copper Filler Metal | | | | | | |
|---|---|---|---|---|---|---|---|---|
| Filler | Process | UT, Ksi | Yield Stress | | % El | % RA | Fracture Location | Fracture Surface |
| | | | .5% | .02% | | | | |
| .38% Zr—.04% B | GTAW | 13 | 7.2 | | 10.5 | .05 | — | |
| | | 15.3 | 7.1 | | — | | | |
| | | 18.1 | 11.1 | | 11.7 | 13.7 | | |
| | | 27.8 | 14 | | 22.7 | 30.3 | | |
| | GMAW | 29.9 | 7.9 | 5.3 | 37.2 | 47.1 | HAZ* | — |

TABLE 5-continued

Room Temperature Tensile Results With Zr—B Copper Filler Metal

| Filler | Process | UT, Ksi | Yield Stress | % El | % RA | Fracture Location | Fracture Surface |
|---|---|---|---|---|---|---|---|
| | | 29 | 7.5 | 4.2 | 32.8 | 47.3 | HAZ | Scattered pores |
| | | | .2% | .02% | | | |
| .24% Zr—.07% B | GTAW | 16 | 7.4 | 4.4 | 13.5 | 14.7 | Weld | 40% hot cracked |
| | GMAW | 29.8 | 5.6 | 11.8 | 44 | 26.7 | HAZ | 3 oxide spots, .02% D |
| | | 27.4 | 3.2 | 6.8 | 70.2 | 48.7 | HAZ |
| .43% Zr—.07% B | GTAW | 31.2 | 9.2 | 5.4 | 46 | 72.6 | HAZ |
| | | 31.2 | 9.2 | 5.5 | 51 | 84.7 | HAZ |
| | | | .5% | | | | |
| ECu | GTAW | 21.5 | 9.2 | — | 13.3 | 11.1 | Weld |
| | | 19.8 | 9.5 | — | 22.9 | — | Weld |

*Heat Affected Zone

Cruciform specimens were evaluated by sectioning and pull testing, the results of which are displayed in Table 6. These test results show the resistance of the Zr–B fillers to notch extension cracking from the notch at the fillet root and resistance to cracking under highly restrained conditions. The weld which did not exhibit any cracking during welding were GTA welds with 0.38% Zr-0.04% B and GMA and GTA welds with 0.43% Zr-0.07% B. The welds with ERCu, a commercial weld filler, were cracked.

TABLE 6

Cruciform Tests For Zr—B High Conductivity Copper Fillers

| % Zr | % B | Process | Load, Lbs | Fillet Size | Width | Notes |
|---|---|---|---|---|---|---|
| .38 | .04 | GMAW | 13,500 | ⅜" | ⅞" | 20% cracked |
| | | | 14,200 | ⅜" | ⅞" | 20% cracked |
| .38 | .04 | GTAW | 8,650 | ⅛" to 3/16" | ⅞" | ⅛" LOF |
| | | | 6,900 | ⅛" to 3/16" | ⅞" | 3/16" LOF |
| .24 | .07 | GMAW | 2,900 | 5/16" | 1" | Hot cracked |
| | | | 1,800 | 5/16" | 1" | Hot cracked |
| .43 | .07 | GMAW | 7,350 | 5/16" | 15/16" | Satisfactory |
| | | | 6,550 | ¼" | 15/16" | Satisfactory |
| .43 | .07 | GTAW | 8,960 | 3/16" | 15/16" | Satisfactory |
| | | | 10,800 | ¼" | 1" | Satisfactory |
| ERCu | | GTAW | 6,000 | ¼" | .996 | factory Hot cracked |
| | | | 5,450 | ¼" | .991 | Hot cracked |

The amounts of zirconium and boron transferred to the weld deposits by the welding processes, GTAW and GMAW, are provided in Table 7. Also included are analyses of the filler materials themselves, plus analyses made on two versions of the commercial filler ERCu. Notable is the fact that the amounts of zirconium and boron remaining in a weld are reduced by about 81% for the GMAW process and about 38.5% for the GTAW process. Recognizing the concentration ranges set forth above for these materials to produce sound welds, an excess amount of either or both may be included in the filler to ensure a sufficient quantity in the resulting welds.

TABLE 7

Chemical Analysis of Zr—B High Conductivity Copper Fillers

| | Zr | B | Si | Mn | Fe | Sn | Pb | Zn | Ni | Cr | As | Ag |
|---|---|---|---|---|---|---|---|---|---|---|---|---|
| | (Parts per Million) | | | | | | | | | | | |
| Filler | 380 | 400 | — | 10 | 100 | 40 | — | 2000 | 50 | 30 | 600 | 40 |
| GTA Weld | 3100 | — | — | <5 | 50 | 40 | — | 100 | 10 | 30 | 300 | 40 |
| Filler | 2480 | 700 | 10 | .4 | 30 | 40 | 8 | ND | 4 | 9 | — | 30 |
| GMA Weld | 300 | 130 | | | | | | | | | | |
| Filler | 4260 | 700 | <10 | .4 | 30 | 30 | 8 | ND | 4 | 20 | — | 30 |
| GMA Weld | 1200 | 120 | | | | | | | | | | |
| GTA Weld | 2400 | 300 | | | | | | | | | | |
| Filler | 3500 | 900 | | | | | | | | | | |
| GTA Weld | — | — | — | .4 | 60 | 30 | 4 | — | 10 | — | — | 30 |
| | (Wt. %) | | | | | | | | | | | |
| ERCu, Specification AWS A5.6 | .5 | .5 | | | | 1 | — | — | (P .15%) | | | |
| Unibraze | .28 | .002 | | | .72 | .0100 | .016 | (P .002%, S .005%) | | | | |
| Welco | .28 | .026 | | | .46 | .0093 | .019 | (P .026%, S .007%) | | | | |

Additional welds, using the 0.43% Zr-0.07% B filler, were made in ¼" and 5/16" plates of electrolytic tough pitch copper and copper of high and low residual phosophorous (about 0.015–0.04%P and 0.001–0.005%P, respectively) using the GTAW process according to the welding parameters of Table 3. Welds in these materials were examined radiographically and microscopically (at 400x). In all cases the resulting welds were found to be of satisfactory quality, exhibiting no cracking and no porosity. Electrical conductivity was, in each case, in excess of 90% of IACS.

Discussion

Boron has heretofore been used or has been suggested for use as a deoxidant in welding copper. However, in practice it has been difficult to retain enough boron in the melt over and above that required to deoxidize the melt to provide adequate deoxidation during a subsequent welding process. Zirconium has typically been used only as an alloying element to provide greater thermal stability in copper. Both elements are known to have low solubility in copper.

The experimental results presented above indicate that an effective weld filler for oxygen-free copper is obtained with a copper alloy containing zirconium and boron in a minimum concentration so as to combine excess boron as zirconium diboride ($ZrB_2$). Low zirconium to boron ratios provide excess boron beyond that soluble in copper and result in weld cracking even with the presence of a relatively high concentration of zirconium. In light of minimum zirconium to boron ratio of 4 to 1, it is most preferable to have, in the filler, a 5 to 1 ratio of zirconium to boron to ensure a margin against excess boron and resultant weld cracking. Further, although 0.03% boron by weight is a minimum level for eliminating porosity, a preferred level is at least 0.05% (500 ppm) boron by weight while maintaining the 5 to 1 zirconium to boron ratio. A zirconium maximum concentration of about 0.60% (6000 ppm) is necessary to avoid deleterious effects on electrical conductivity. Preferably, however, zirconium is maintained below about 0.50%. The amounts of zirconium and boron in fillers for gas metal arc welding (GMAW) is preferably higher than those for gas tungsten arc welding (GTAW) due to the greater loss of the deoxidants when welding with the GMAW process.

FIG. 3 is a summary plot of experimental results (as detailed above) for various ratios of zirconium and boron. The plot is divided into three regions, (I, II, and III), with each region defining a separate set of results obtained with those weld fillers falling within that particular region. A line defining the 4 to 1 zirconium to boron ratio divides region I from regions II and III. Fillers falling below that line, in region I, have boron in excess of that necessary for combining with all of the zirconium to form zirconium diboride. Fillers in Region I produce welds of good electrical conductivity but such welds are weakened by cracking. Fillers above the 4 to 1 ratio line in region II, do not have the minimum level of boron (about 300 ppm) necessary to eliminate porosity but do have sufficient zirconium to prevent cracking. Weld fillers according to the invention fall in region III and are productive of sound welds. A preferred subregion, as defined above (but not specifically delineated in FIG. 3), is bounded by a 5 to 1 zirconium to boron ratio, a minimum level of 500 ppm boron, and a maximum level of 5000 ppm zirconium.

Thus, while the foregoing sets forth the best mode contemplated for carrying out the invention and describes the manner and process by which the invention may be made and used, it will be understood that specific embodiments set forth herein are not intended to be limiting and that other modifications and variations, which remain within the spirit and scope of the invention, may occur to those of skill in the art. It is intended that all such modifications and variations be considered within the scope of the following claims.

The invention claimed is:

1. A Method of joining two copper segments together such that the electrical conductivity and the mechanical properties of the joined segments are substantially preserved which comprises:
   bringing both copper segments in close proximity to each other;
   bringing a copper alloy filler in close proximity to both segments, said copper alloy filler consisting essentially of, in weight percent, about 0.03% to about 0.08% boron, about 0.12% to about 0.60% zirconium, the balance being copper together with impurities and incidential elements normally associated with copper and said copper alloy filler having a ratio of zirconium to boron of at least 4 to 1; and
   welding said copper segments together by melting said copper alloy filler.

2. A copper assembly made by the method as recited in claim 1 above wherein said segments are arc welded.

3. A method of joining two copper segments together as recited in claim 1 above wherein said boron is 0.05% to 0.08%, said zirconium is 0.25% to 0.50%, and said ratio of zirconium to boron is at least 5 to 1.

4. A copper assembly made by the method as recited in claim 3 above wherein said segments are arc welded.

5. Method of joining two copper segments of relatively high electrical conductivity together such that the electrical conductivity and the mechanical properties of the joined segments are substantially preserved which comprises:
   bringing both copper segments in close proximity to each other;
   bringing a copper alloy filler in close proximity to both segments, said copper alloy filler consisting essentially of, in weight percent, about 0.03% to about 0.08% boron, about 0.12% to about 0.60% zirconium, the balance being copper together with impurities and incidental elements normally associated with copper and said copper alloy filler having a ratio of zirconium to boron of at least 4 to 1; and
   welding said copper segments together by melting said copper alloy filler.

6. A copper assembly made by the method as recited in claim 5 above.

7. Method of joining two copper segments together such that the electrical conductivity of the joined segments is substantially equivalent to that of the copper which comprises:
   bringing both copper segments in close proximity to each other;
   bringing a copper alloy filler in close proximity to both segments, said copper alloy filler consisting essentially of, in weight percent, about 0.03% to about 0.08% boron, about 0.12% to about 0.60% zirconium, the balance being copper together with impurities and incidental elements normally associated with copper and
   said copper alloy filler having a ratio of zirconium to boron of at least 4 to 1; and arc welding said copper segments together by melting said copper alloy filler.

8. A copper assembly made by the method as recited in claim 7 above.

9. A method as recited in claim 7 above wherein said boron is 0.05% to 0.08%, said zirconium is 0.25% to 0.50%, and said ratio of zirconium to boron is at least about 5 to 1.

10. A copper assembly made by the method recited in claim 9 above.

11. A joined copper assembly comprising:
two copper segments welded together with a copper alloy filler consisting essentially of, in weight percent, about 0.03% to about 0.08% boron, about 0.12% to about 0.60% zirconium, the balance being copper together with impurities and incidental elements normally associated with copper, and wherein the ratio of zirconium to boron is at least 4 to 1.

12. A copper to copper joint wherein two copper segments are joined together comprising:
two copper segments welded together utilizing a copper alloy filler consisting essentially of, in weight percent, about 0.03% to about 0.08% boron, about 0.12% to about 0.60% zirconium, the balance being copper together with impurities and incidental elements normally associated with copper, and wherein the ratio of zirconium to boron is at least about 4 to 1.

13. A copper to copper butt welded joint wherein two copper segments are joined together comprising:
two copper segments butt welded together utilizing a copper alloy filler consisting essentially of, in weight percent, about 0.03% to about 0.08% boron, about 0.12% to about 0.60% zirconium, the balance being copper together with impurities and incidental elements normally associated with copper, and wherein the ratio of zirconium to boron is at least about 4 to 1.

14. A copper to copper fillet welded joint wherein two copper segments are joined together comprising:
two copper segments cruciform welded together utilizing a copper alloy filler consisting essentially of, in weight percent, about 0.03% to about 0.08% boron, about 0.12% to about 0.60% zirconium, the balance being copper together with impurities and incidental elements normally associated with copper, and wherein the ratio or zirconium to boron is at least about 4 to 1.

* * * * *